US008616741B2

(12) United States Patent
Ookubo

(10) Patent No.: US 8,616,741 B2
(45) Date of Patent: Dec. 31, 2013

(54) VEHICLE HEADLAMP

(75) Inventor: Yasuhiro Ookubo, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 910 days.

(21) Appl. No.: 12/603,312

(22) Filed: Oct. 21, 2009

(65) Prior Publication Data

US 2010/0110714 A1 May 6, 2010

(30) Foreign Application Priority Data

Oct. 30, 2008 (JP) ................................ 2008-280071

(51) Int. Cl.
*B60Q 1/00* (2006.01)

(52) U.S. Cl.
USPC ............ 362/507; 362/514; 362/517; 362/518

(58) Field of Classification Search
USPC ................................ 362/507, 514, 517, 518
See application file for complete search history.

(56) References Cited

U.S. PATENT DOCUMENTS

| | | | | |
|---|---|---|---|---|
| RE15,088 | E | 4/1921 | Schroeder | |
| 4,831,506 | A | 5/1989 | Miyazawa | |
| 5,060,120 | A | 10/1991 | Kobayashi et al. | |
| 5,086,376 | A | 2/1992 | Blusseau | |
| 6,000,816 | A * | 12/1999 | Serizawa et al. | 362/297 |
| 6,004,014 | A * | 12/1999 | Yamamura et al. | 362/518 |
| 6,334,702 | B1 | 1/2002 | Albou | |
| 6,457,849 | B2 | 10/2002 | Tsukamoto | |
| 6,626,565 | B2 | 9/2003 | Ishida | |
| 6,994,454 | B2 * | 2/2006 | Kinouchi | 362/351 |
| 7,059,755 | B2 | 6/2006 | Yatsuda et al. | |
| 7,108,412 | B2 | 9/2006 | Ishida et al. | |
| 7,156,544 | B2 * | 1/2007 | Ishida | 362/538 |
| 7,232,247 | B2 | 6/2007 | Yatsuda et al. | |
| 7,311,430 | B2 | 12/2007 | Tsukamoto et al. | |
| 7,484,872 | B2 | 2/2009 | Yatsuda et al. | |
| 7,607,811 | B2 * | 10/2009 | Okada | 362/545 |
| 7,682,038 | B2 | 3/2010 | Wood | |
| 7,748,879 | B2 | 7/2010 | Koike et al. | |
| 7,950,837 | B2 | 5/2011 | Yatsuda et al. | |
| 2004/0125614 | A1 * | 7/2004 | Ishida et al. | 362/509 |
| 2004/0213014 | A1 | 10/2004 | Koike | |

(Continued)

FOREIGN PATENT DOCUMENTS

| | | | |
|---|---|---|---|
| DE | 38 26 988 | A1 | 2/1990 |
| DE | 10 2004 012 184 | A1 | 12/2004 |

(Continued)

OTHER PUBLICATIONS

U.S. Appl. No. 12/603,317, filed Oct. 21, 2009, Ookubo et al.

(Continued)

*Primary Examiner* — Jong-Suk (James) Lee
*Assistant Examiner* — Mark Tsidulko
(74) *Attorney, Agent, or Firm* — Foley & Lardner LLP

(57) ABSTRACT

A vehicle headlamp is provided with: a reflector having reflecting surfaces made of a parabola-based free curved face; and semiconductor-type light sources having a light emitting chip shaped like a planar rectangle. The reflecting surfaces 2U, 2D are made up of: a first reflecting surface forming a high luminous intensity zone; a second reflecting surface forming a middle luminous intensity zone; and a third reflecting surface forming a low luminous intensity zone. As a result, the vehicle headlamp allows downsizing, weight reduction, and cost reduction. In addition, precision of assembling optical elements can be improved.

9 Claims, 7 Drawing Sheets

(56) References Cited

U.S. PATENT DOCUMENTS

| | | | |
|---|---|---|---|
| 2004/0223338 | A1 | 11/2004 | Koike et al. |
| 2004/0252517 | A1 | 12/2004 | Ishida et al. |
| 2005/0088853 | A1 | 4/2005 | Yatsuda et al. |
| 2006/0120081 | A1 | 6/2006 | Yatsuda et al. |
| 2007/0086202 | A1 | 4/2007 | Tsukamoto et al. |
| 2007/0263404 | A1 | 11/2007 | Yatsuda et al. |
| 2008/0089085 | A1 | 4/2008 | Popelek |
| 2009/0231875 | A1 | 9/2009 | Yatsuda et al. |
| 2010/0194276 | A1 | 8/2010 | Okubo |

FOREIGN PATENT DOCUMENTS

| | | | |
|---|---|---|---|
| EP | 0 373 065 | B1 | 6/1990 |
| EP | 1 225 387 | B1 | 7/2002 |
| FR | 2 808 867 | A1 | 11/2001 |
| JP | 2004-342574 | A | 12/2004 |
| JP | 2005-129404 | A | 5/2005 |
| JP | 2007-109493 | A | 4/2007 |
| JP | 2007-172882 | A | 7/2007 |

OTHER PUBLICATIONS

Y. Okubo, U.S. PTO Office Action, U.S. Appl. No. 12/648,915, dated Feb. 22, 2012, 12 pages.

Y. Okubo, U.S. PTO Notice of Allowance, U.S. Appl. No. 12/603,317, dated Feb. 24, 2012, 8 pages.

Y. Ookubo, U.S. PTO Notice of Allowance, U.S. Appl. No. 12/648,915, dated Apr. 27, 2012, 9 pages.

Y. Ookubo, U.S. PTO Office Action, U.S. Appl. No. 12/603,317, dated Dec. 7, 2011, 13 pages.

* cited by examiner

VEHICLE HEADLAMP

CROSS-REFERENCE TO RELATED APPLICATIONS

This application claims priority of Japanese Patent Application No. 2008-280071 filed on Oct. 30, 2008. The contents of this application are incorporated herein by reference in their entirety.

BACKGROUND OF THE INVENTION

1. Field of the Invention

The present invention relates to a vehicle headlamp for illuminating a light distribution pattern, for example a light distribution pattern for low beam (light distribution pattern for passing), toward a forward direction of a vehicle, the light distribution pattern having an oblique cutoff line at a cruising lane side and having a horizontal cutoff line at an opposite lane side, with an elbow point serving as a boundary.

2. Description of the Related Art

Vehicle headlamps of this type are conventionally known (Japanese Laid-open Patent Application No. 2007-109493 and Japanese Laid-open Patent Application No. 2007-172882, for example). Hereinafter, a conventional vehicle headlamp will be described. The conventional vehicle headlamp is a projector-type lamp unit, and is provided with a light source, an elliptical (convergent) reflector, a shade, and a projecting lens. Hereinafter, functions of the conventional vehicle headlamp will be described. When a light source is lit, the light from the light source is reflected by means of the reflector; a part of the reflected light is cut off by means of the shade. Afterwards, a light distribution pattern having an oblique cutoff line and a horizontal cutoff line is formed; and the light distribution pattern having the oblique cutoff line and the horizontal cutoff line is inverted longitudinally or transversely from the projecting lens, and is illuminated (projected) toward a forward direction of a vehicle.

However, the conventional vehicle headlamp is provided with a light source, a reflector, a shade, and a projecting lens, so that a large number of components are required, and there is a problem concerning downsizing, weight reduction, and cost reduction accordingly. Moreover, in the conventional vehicle headlamp, a relationship between the numbers of constituent light sources and optical elements is obtained as that of one constituent light source to three constituent optical elements, i.e., a reflector, a shade and a projecting lens (1:3). Thus, in the conventional vehicle headlamp, an error concerning a combination of variations in the three constituent optical elements, i.e., the reflector, the shade and the projecting lens occurs, and there is a problem concerning precision of assembling the three constituent optical elements, i.e., the reflector, the shade, and the projecting lens.

The present invention has been made in order to solve a problem concerning downsizing, weight reduction, or cost reduction and a problem concerning precision of assembling the three constituent optical elements, i.e., the reflector, the shade, and the projecting lens, which remain unsolved in the conventional vehicle headlamp.

SUMMARY OF THE INVENTION

A first aspect of the present invention is directed to a vehicle headlamp for illuminating a light distribution pattern to a forward direction of a vehicle, the light distribution pattern having an oblique cutoff line at a cruising lane side and a horizontal cutoff line at an opposite lane side, with an elbow point serving as a boundary, the vehicle headlamp comprising:

(i) a reflector having a reflecting surface made of a parabola-based free curved face; and (ii) a semiconductor-type light source having a light emitting chip shaped like a planar rectangle, wherein:

a center of the light emitting chip is positioned at or near a reference focal point of the reflecting surface and is positioned on a reference optical axis of the reflecting surface;

a light emitting face of the light emitting chip is oriented to a vertical-axis axial direction;

a long side of the light emitting chip is parallel to a horizontal axis orthogonal to the reference optical axis and the vertical axis;

the reflecting surface is made up of a first reflecting surface and a second reflecting surface at a central part and a third reflecting surface at an end part, divided in the vertical-axis direction;

the first reflecting surface is a reflecting surface made of a free curved face for light-distributing and controlling a reflection image of the light emitting chip, so that the reflection image of the light emitting chip does not run out of the oblique cutoff line and the horizontal cutoff line and a part of the reflection image of the light emitting chip is substantially in contact with the oblique cutoff line and the horizontal cutoff line;

the second reflecting surface is a reflecting surface made of a free curved face for light-distributing and controlling a reflecting image of the light emitting chip, so that the reflection image of the light emitting chip does not run out of the oblique cutoff line and the horizontal cutoff line and a part of the reflection image of the light emitting chip is substantially in contact with the oblique cutoff line and the horizontal cutoff line and so that density of a reflection image group of the light emitting chip becomes lower than density of a reflection image group of the light emitting chip according to the first reflecting surface and the reflection image group of the light emitting chip contains the reflection image group of the light emitting chip according to the first reflecting surface; and the third reflecting surface is a reflecting surface made of a free curved face for light-distributing and controlling a reflecting image of the light emitting chip, so that the reflection image of the light emitting chip is substantially included in the light distribution pattern, the density of the reflection image group of the light emitting chip becomes lower than the density of the reflection image group of the light emitting clip according to the first reflecting surface and the second reflecting surface, and the reflection image group of the light emitting chip contains the reflection image group of the light emitting chip according to the first reflecting surface and the second reflecting surface.

A second aspect of the present invention is directed to the vehicle headlamp according to the first aspect, wherein:

the reflector is substantially shaped like a rotating parabola face;

a size of an opening of the reflector is about 100 mm or less in diameter;

a reference focal point of the reflecting surface is on the reference optical axis and is positioned between a center of the light emitting chip and a long side at a rear side of the light emitting chip;

a reference focal point distance of the reflecting surface is about 10 mm to 18 mm; and the first reflecting surface and the second reflecting surface are provided in a range in which a longitudinal angle from the center of the light emitting chip is within about ±40 degrees, the range being equivalent to a range in which a reflection image is produced within a tilt angle of the reflection image of the light emitting chip with respect to a screen horizon, the angle being obtained by adding about 5 degrees to a tilt angle of the oblique cutoff line, and in a range of high energy in energy distribution of the light emitting chip.

A third aspect of the present invention is directed to the vehicle headlamp according to the first aspect, wherein:

the reflecting surface and the semiconductor-type light source are disposed so that an upside unit, a light emitting face of the light emitting chip being oriented upward in the vertical-axis direction, and a downside unit, a light emitting face of the light emitting chip being oriented downward in the vertical-axis direction, are established in a point-symmetrical state.

A fourth aspect of the present invention is directed to a vehicle headlamp, comprising:

(i) a semiconductor-type light source for emitting light;

(ii) a reflector made of a parabola-based curved face, having a plurality of reflecting surfaces which is divided along the vertical-axis direction, for reflecting light radiated in a vertical-axis direction from a light emitting face of the semiconductor-type light source, as reflection light, so as to illuminate the reflected light toward a forward direction of a vehicle, wherein:

the plurality of reflecting surfaces of the reflector includes a predetermined reflecting surface provided in a range in which a reflection image of the semiconductor-type light source is obtained within a longitudinal angle of ±40 degrees from a center in a vertical-axis direction of the light emitting face of the semiconductor-type light source and in a range of high energy in energy distribution of the semiconductor-type light source.

A fifth aspect of the present invention is directed to the vehicle headlamp according to the fourth aspect, wherein:

the predetermined reflecting surface of the reflector is further provided in a range in which the reflection image of the semiconductor-type light source is obtained within an angle obtained by adding about 5 degrees to a tilt angle of an oblique cutoff line with respect to a screen horizontal face.

A sixth aspect of the present invention is directed to the vehicle headlamp according to the fourth aspect, wherein:

the predetermined reflecting surface of the reflector is further provided in a range in which the reflection image of the semiconductor-type light source is obtained within about 20 degrees with respect to a screen horizontal face.

A seventh aspect of the present invention is directed to the vehicle headlamp according to the fourth aspect, wherein:

the predetermined reflecting surface of the reflector is provided at a center of the reflector, and light-distributes a reflection image of the semiconductor-type light source so that the reflection image of the semiconductor-type light source does not run out of an oblique cutoff line and a horizontal cutoff line and so that a part of the reflection image of the semiconductor-type light source is substantially in contact with the oblique cutoff line and the horizontal cutoff line.

An eighth aspect of the present invention is directed to the vehicle headlamp according to the fourth aspect, wherein:

the predetermined reflecting surface of the reflector include a first reflecting surface and a second reflecting surface adjacent to each other at a center of the reflector;

the first reflecting surface is a reflecting surface on which a reflection image group of the semiconductor-type light source according to the first reflecting surface is formed near the oblique cutoff line and the horizontal cutoff line in comparison with the refection image group of the semiconductor-type light source according to the second reflecting surface, and density of the reflection image group of the semiconductor-type light source according to the first reflecting surface is higher than density of the reflection image group of the semiconductor-type light source according to the second reflecting surface; and the second reflecting surface has a light distribution range of the reflection image of the semiconductor-type light source including a light distribution range of the reflection image of the semiconductor-type light source according to the first reflecting surface so that the reflection image group of the semiconductor-type light source according to the second reflecting surface contains the reflection image group of the semiconductor-type light source according to the first reflecting surface.

A ninth aspect of the present invention is directed to the vehicle headlamp according to the eighth aspect, wherein:

the reflector includes a third reflecting surface arranged at a respective one of end sides of the predetermined reflecting surface made up of the first reflecting surface and the second reflecting surface; and the third reflecting surface has a light distribution range of a reflection image of the semiconductor-type light source, including a light distribution range of the reflection images of the semiconductor-type light source according to the first reflecting surface and the second reflecting surface, so that density of the reflection image group of the semiconductor-type light source according to the third reflecting surface is lower than density of the reflection image groups of the semiconductor-type light source according to the first reflecting surface and the second reflecting surface, and the reflection image group of the semiconductor-type light source according to the third reflecting surface contains the reflection image groups of the semiconductor-type light source according to the first reflecting surface and the second reflecting surface.

A tenth aspect of the present invention is directed to the vehicle headlamp according to the fourth aspect, wherein:

light radiated from the semiconductor-type light source is reflected by means of a plurality of reflecting surfaces including the predetermined reflecting surface of the reflector, as a light distribution pattern for low beam, formed by an oblique cutoff line of a cruising lane and a horizontal cutoff line at an opposite lane side, and the reflected light is illuminated toward the forward direction of the vehicle.

An eleventh aspect of the present invention is directed to a vehicle headlamp, comprising:

(i) a semiconductor-type light source for emitting light;

(ii) a reflector made of a parabola-based curved face, having a plurality of reflecting surfaces which are divided along the vertical-axis direction, for reflecting light radiated in a vertical-axis direction from a light emitting face of the semiconductor-type light source, as reflection light, so as to illuminate the reflected light toward a forward direction of a vehicle, wherein:

the plurality of reflecting surfaces of the reflector includes:

- a first reflecting surface and a second reflecting surface which are adjacent to each other at a center of the reflector and are arranged in a range of high energy in energy distribution of the semiconductor-type light source; and
- a third reflecting surface which is arranged at a respective one of ends of the reflector so as to sandwich the first reflecting surface and the second reflecting surface therebetween, and is arranged in a range of low energy in energy distribution of the semiconductor-type light source; and wherein:

the first reflecting surface is a reflecting surface on which a reflection image group of the semiconductor-type light source according to the first reflecting surface is formed near the oblique cutoff line and the horizontal cutoff line in comparison with the refection image group of the semiconductor-type light source according to the second reflecting surface, and density of the reflection image group of the semiconductor-type light source according to the first reflecting surface is higher than density of the reflection image group of the semiconductor-type light source according to the second reflecting surface; and the first reflecting surface and the second reflecting surface are provided in a range in which a reflection image of the semiconductor-type light source is obtained within a longitudinal angle of about ±40 degrees from a center in a vertical-axis direction of the light emitting face of the semiconductor-type light source.

A twelfth aspect of the present invention is directed to the vehicle headlamp according to the eleventh aspect, wherein:

the first reflecting surface and the second reflecting surface of the reflector are further provided in a range in which a reflection image of the semiconductor-type light source is obtained within about 20 degrees with respect to a screen horizontal face.

A thirteenth aspect of the present invention is directed to the vehicle headlamp according to the eleventh aspect, wherein:

the first reflecting surface and the second reflecting surface of the reflector light-distribute the reflection images of the semiconductor light source so that the reflection image of the semiconductor-type light source does not run out of the oblique cutoff line and the horizontal cutoff line and a part of the reflection image of the semiconductor-type light source is substantially in contact with the oblique cutoff line and the horizontal cutoff line.

The vehicle headlamp according to the first aspect of the present invention is characterized in that, if a light emitting chip of a semiconductor-type light source is lit to emit light by means for solving the problem described previously, light radiated from the light emitting chip is reflected on a reflecting surface of a reflector; and a light distribution pattern having an oblique cutoff line on a cruising lane side and having an horizontal cutoff line at an opposite lane side, with an elbow point serving as a boundary, is illuminated toward a forward direction of a vehicle. In other words, the light distribution pattern is illuminated toward the forward direction of the vehicle so that: a reflection image of a light emitting chip, reflected on the first reflecting surface, does not run out of the oblique cutoff line and the horizontal cutoff line; a part of the reflection image of the light emitting chip is substantially in contact with the oblique cutoff line and the horizontal cutoff line. Moreover, the light distribution pattern is illuminated toward the forward direction of a vehicle so that: a reflection image of a light emitting chip, reflected on the second reflecting surface, does not run out of the oblique cutoff line and the horizontal cutoff line; a part of the reflection image of the light emitting chip is substantially in contact with the oblique cutoff line and the horizontal cutoff line; and density of a reflection image group of the light emitting chip becomes lower than density of a reflection image group of the light emitting chip according to the first reflecting surface. Further, the light distribution pattern is illuminated toward the forward direction of the vehicle so that: a reflection image of the light emitting chip, reflected on a third reflecting surface, is substantially included in the light distribution pattern; and density of a reflection image group of the light emitting chip becomes lower than density of reflection image groups of the light emitting chips by the first and second reflecting surfaces. In this manner, the vehicle headlamp according to the first aspect of the present invention allows a high luminous intensity zone to be light-distributed and controlled by means of the first reflecting surface, near the oblique cutoff line of the cruising lane side and the horizontal cutoff line at the opposite lane side, of the light distribution pattern, so that long-distance visibility is improved and no stray light is imparted to an oncoming car or pedestrian, etc., making it possible to contribute to traffic safety as a result thereof. Moreover, the vehicle headlamp according to the first aspect of the present invention is characterized in that, a middle luminous intensity zone which is light-distributed and controlled on the second reflecting surface encompasses a high luminous intensity zone near the oblique cutoff line at the cruising lane side, of the light distribution pattern light-distributed and controlled on the first reflecting surface, and the horizontal cutoff line at the opposite lane side, so that the high luminous intensity zone near the oblique cutoff line at cruising lane side, of the light distribution pattern light-distributed and controlled on the first reflecting surface, and the horizontal cutoff line at the opposite lane side, is connected to a low luminous intensity zone of the entire light distribution pattern light-distributed and controlled on the third reflecting surface, in the middle luminous intensity zone near the oblique cutoff line at the cruising lane side and the horizontal cutoff line at the opposite lane side, of the light distribution pattern light-distributed and controlled on the second reflecting surface, and a smooth change in luminous intensity occurs. As a result, the vehicle headlamp according to the first aspect of the present invention becomes capable of light-distributing and controlling a light distribution pattern having an oblique cutoff line and a horizontal cutoff line, the pattern being optimal for vehicle use.

Moreover, the vehicle headlamp according to the first aspect of the present invention is made of a reflector and a semiconductor-type light source, so that the number of components is reduced in comparison with the conventional vehicle headlamp, and downsizing, weight reduction, or cost reduction can be achieved accordingly. Furthermore, the vehicle headlamp according to the first aspect of the present invention is characterized in that a relationship in the number of components between light sources and optical elements is obtained as that of one semiconductor light source to one optical element made of a reflector (1:1). As a result, the vehicle headlamp according to the first aspect of the present invention becomes capable of eliminating an error concerning a combination of variations at the optical element side and improving precision of assembling the reflector at the optical element, in combination with the conventional vehicle headlamp in which a relationship between the numbers of constituent light sources and optical elements is one constituent light source to three constituent optical elements, i.e., a reflector, a shade, and a projecting lens (1:3).

In addition, the vehicle headlamp according to the second aspect of the present invention becomes capable of reliably achieving both light-distributing and controlling of a light distribution pattern, optimal for vehicle use, and downsizing of a lamp unit, by means for solving the problem described previously.

Further, the vehicle headlamp according to the third aspect of the present invention is characterized in that a reflecting surface and a semiconductor-type light source are disposed so that an upside unit, a light emitting face of the light emitting chip being oriented upward in the vertical-axis direction and a downside unit, a light emitting face of the light emitting chip is oriented downward in the vertical-axis direction are established in a point-symmetrical state. As a result, even if a reflector is downsized, luminous intensity of a light distribution pattern is sufficiently obtained, thus ensuring that the vehicle headlamp according to the third aspect of the present invention becomes capable of more reliably achieving both light-distributing and controlling of a light distribution pattern, which is optimal for vehicle use, and downsizing of a lamp unit.

DESCRIPTION OF THE PREFERRED EMBODIMENTS

Figure 10:
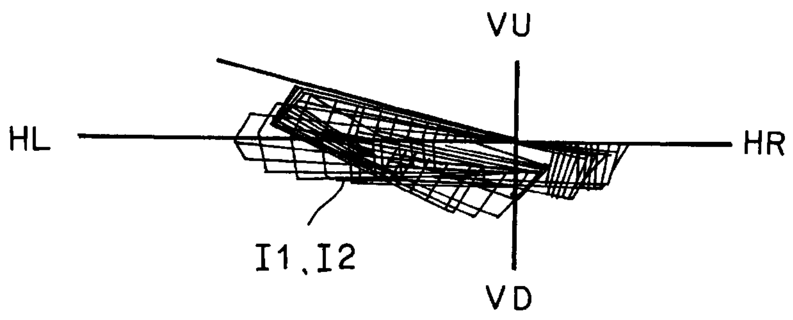
FIG. 10 is an explanatory view showing a group of reflection images of the light emitting chip, obtained on the first reflecting surface made of the fourth segment, similarly.
Figure 11:
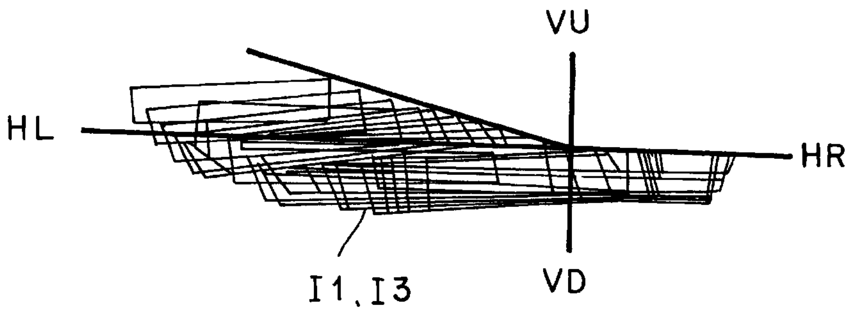
FIG. 11 is an explanatory view showing a group of reflection images of the light emitting chip, obtained on the second reflecting surface made of the fifth segment, similarly.

Hereinafter, an embodiment of a vehicle headlamp according to the present invention will be described in detail, referring to the drawings. The present invention is not limited by the embodiment. In the drawings, the letter symbol "VU-VD" designates a vertical line of the top and bottom of a screen; and the letter symbol "HL-HR" designates a horizontal line of the left and right of the screen. FIGS. 10 and 11 are explanatory views, each of which shows a group of reflection images of a light emitting chip on a screen, obtained by computer simulation. In the specification and claims, the terms "top", "bottom, "front", "rear", "left", and "right" designate "top", "bottom", "front", "rear", "left", and "right" of a vehicle when the vehicle headlamp according to the present invention is mounted on a vehicle (automobile).

Figure 12:
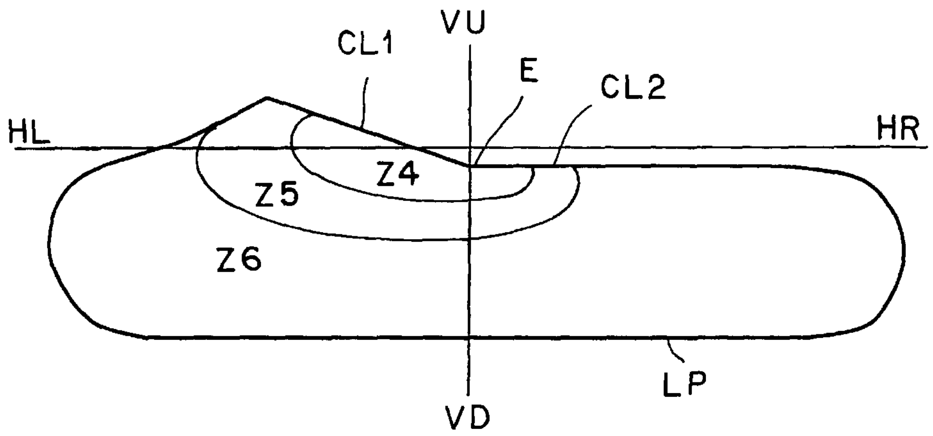
FIG. 12 is an explanatory view showing a light distribution pattern for low beam, having an oblique cutoff line and a horizontal cutoff line, similarly.

Hereinafter, a configuration of the vehicle headlamp in the embodiment will be described. In the drawings, reference numeral 1 denotes the vehicle headlamp (automobile headlamp) in the embodiment. The vehicle headlamp 1, as shown in FIG. 12, has an oblique cutoff line CL1 at a cruising lane side (left side), with an elbow point E being a boundary, and illuminates a light distribution pattern, for example, a light distribution pattern for low beam (light distribution pattern for passing) LP, to a forward direction of the vehicle, the light distribution pattern having a horizontal cutoff line CL2 on the opposite lane side (right side). An angle which is formed by the oblique cutoff line CL 1 and the horizontal line HL-HR of the screen is about 15 degrees.

The vehicle headlamp 1 is made up of: a reflector 3 having an upside reflecting surface 2U made of a parabola-based, free curved face (NURBS-curved face) and a downside reflecting surface 2D; an upside semiconductor-type light source 5U and a downsize semiconductor-type light source 5D having a light emitting chip 4 formed in a planar rectangular shape (planar elongated shape); a holder 6; a heat sink member 7; and a lamp housing and a lamp lens, although not shown (such as a transparent outer lens, for example).

The holder 6 is formed in a planar shape having an upper fixing face and a lower fixing face. The holder 6 is made up of a resin member or a metal member with a high thermal conductivity, for example. The heat sink member 7 is formed in a trapezoidal shape having an upper fixing face at its upper part, and is shaped like a fin from its intermediate part to its lower part. The heat sink member 7 is made of a resin member or a metal member with a high thermal conductivity, for example.

The reflector 3, the upside semiconductor-type light source 5U, the downside semiconductor-type light source 5D, the holder 6, and the heat sink member 7 constitute a lamp unit. In other words, the reflector 3 is fixed and held by means of the holder 6. The upside semiconductor-type light source 5U is fixed and held on the upper fixing face of the holder 6. The downside semiconductor-type light source 5D is fixed and held on the lower fixing face of the holder 6. The holder 6 is fixed and held on the upper fixing face of the heat sink member 7.

The lamp units 3, 5U, 5D, 6, 7 are disposed via an optical-axis adjustment mechanism, for example, in a lamp room partitioned by the lamp housing and the lamp lens. In the lamp room, apart from the lamp units 3, 5U, 5D, 6, 7, another lamp unit such as a fog lamp, a cornering lamp, a clearance lamp, or a turning signal lamp may be disposed.

Figure 1:
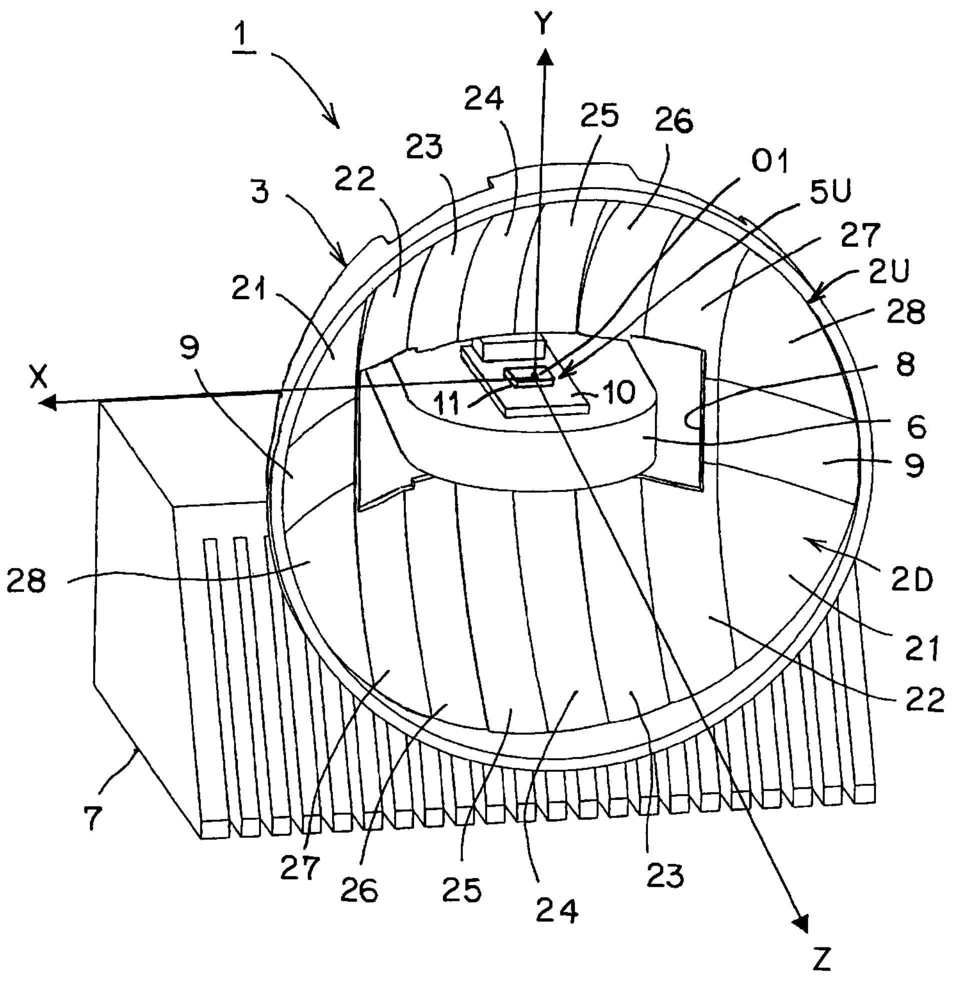
FIG. 1 is a perspective view of essential parts showing an embodiment of a vehicle headlamp according to the present invention.
Figure 2:
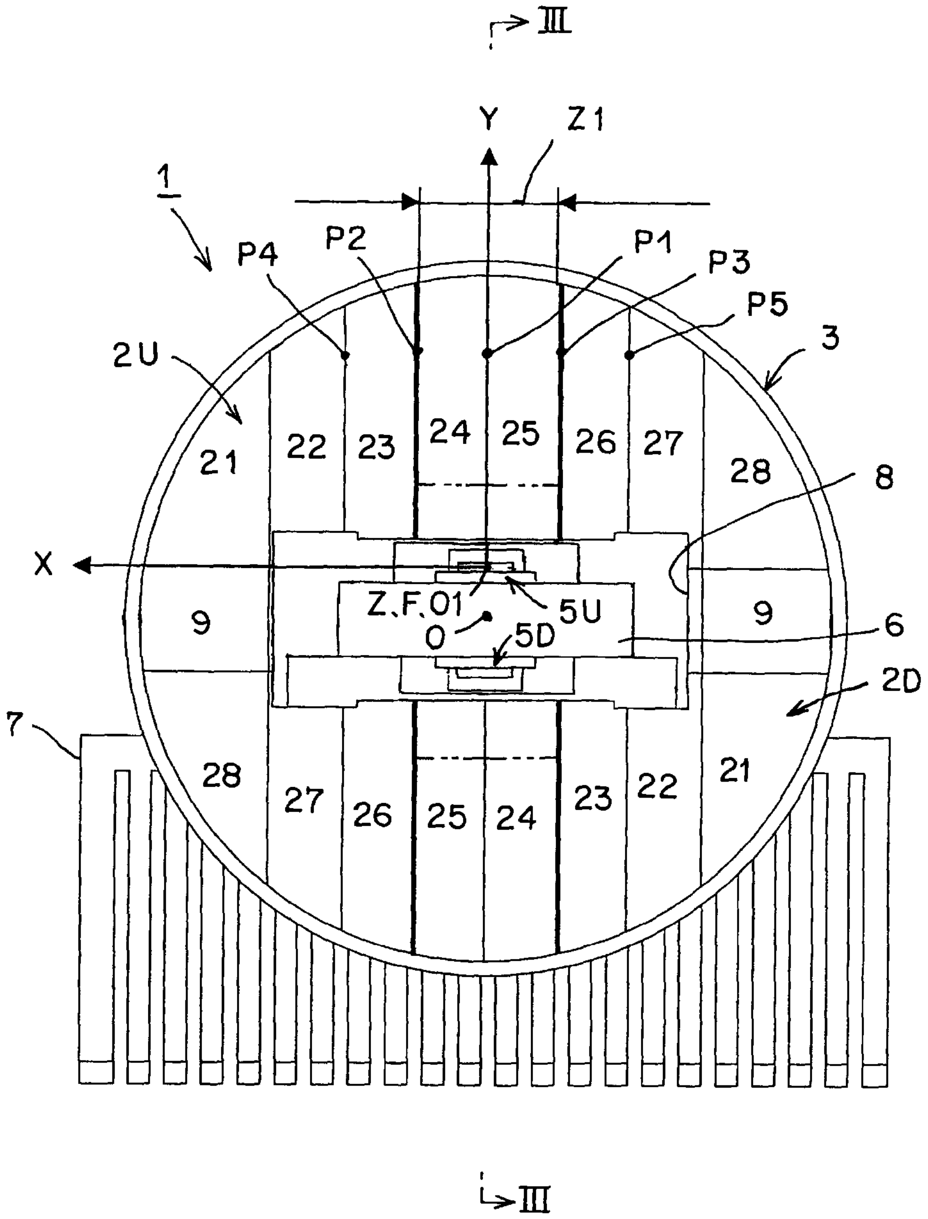
FIG. 2 is a front view showing the essential parts, similarly.

The upside reflecting surface 2U and the upside semiconductor-type light source 5U constitute an upside unit in which a light emitting face of the light emitting chip 4 is oriented upward in a vertical-axis Y direction. In addition, the downside reflecting surface 2D and the downside semiconductor-type light source 5D constitute a downside unit in which a light emitting face of the light emitting chip 4 is oriented downward in the vertical-axis Y direction. The upside units 2U, 5U and the downside units 2D, 5D, as shown in FIG. 2, are disposed to be point-symmetrical around a point O. A reflecting surface design of the upside reflecting surface 2U and a reflecting surface design of the downside reflecting surface 2D are not merely point-symmetrical (not inverted).

The reflector 3 is made up of an optically impermeable resin member, for example. The reflector 3 is substantially shaped like a rotational parabola face while an axis passing through the point-symmetrical point O is defined as a rotational axis. A front side of the reflector 3 is substantially circularly opened. The side of the opening at the front side of the reflector 3 is about 100 mm or less in diameter, or preferably, is about 50 mm or less. On the other hand, a rear side of the reflector 3 is closed. A landscape, substantially rectangular window portion 8 is provided at the intermediate part of the closed portion of the reflector 3. The holder 6 is inserted into the window portion 8 of the reflector 3. The reflector 3 is fixed and held at the outside (rear side) of the closed portion by means of the holder 6.

Of the inside (front side) of the closed portion of the reflector 3, the upside reflecting surface 2U and the downside reflecting surface 2D are provided at the upside and downside of the window portion 8, respectively. The upside reflecting surface 2U and the downside reflecting surface 2D made of a parabola-based, free curved face (NURBS-curved face) has a reference focal point (pseudo-focal point) F and a reference optical axis (pseudo-optical axis) Z. A reflection-free surface 9 is between the upside reflecting surface 2U and the downside reflecting face 2D, and is provided at a respective one of the left and right sides of the window portion 8 at the inside (front side) of the closed portion of the reflector 3.

Figure 4:
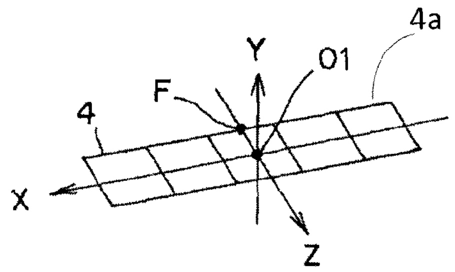
FIG. 4 is an explanatory perspective view showing a relative position relationship between a center of a light emitting chip and a reference focal point of a reflecting surface, similarly.
Figure 5:
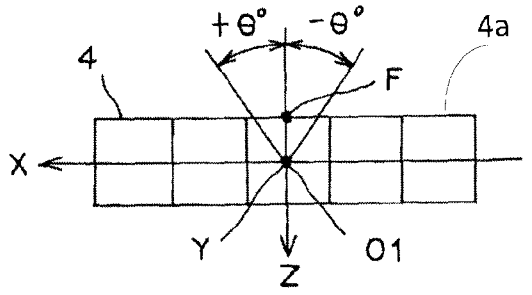
FIG. 5 is an explanatory plan view showing a relative position relationship between the center of the light emitting chip and the reference focal point of the reflecting surface, similarly.

The semiconductor-type light sources 5U, 5D are made up of: a board 10; the light emitting chip 4 provided on the board 10; and a sealing resin member 11 formed on a thinly rectangular shape, for sealing the light emitting chip 4. The light emitting chip 4, as shown in FIGS. 4 and 5, is formed in a state in which five square chips are arrayed in a horizontal-axis X direction. One rectangular chip may be used.

A center O1 of the light emitting chip 4 is positioned at or near a reference focal point F of the reflecting surfaces 2U, 2D, and is positioned on the reference optical axis Z of the reflecting surfaces 2U, 2D. In addition, a light emitting face of the light emitting chip 4 (a face opposite to a face opposed to the substrate 10) is oriented to the vertical-axis Y direction. In other words, the light emitting face of the light emitting chip 4 of the upside semiconductor-type light source 5U is oriented upward in the vertical-axis Y direction. On the other hand, the light emitting face of the light emitting chip 4 of the downside semiconductor-type light source 5D is oriented downward in the vertical-axis Y direction. Further, a long side 4*a* of the light emitting chip 4 is parallel to a horizontal-axis X that is orthogonal to the reference optical axis Z and the vertical axis Y.

The horizontal axis X, the vertical axis Y, and the reference optical axis Z constitute an orthogonal coordinate (X-Y-Z orthogonal coordinate system) with a center O1 of the light emitting chip 4 serving as an origin. In the horizontal axis X, in the case of the upside units 2U, 5U, the right side corresponds to a positive direction and the left side corresponds to a negative direction, and in the case of the downward units 2D, 5D, the left side corresponds to a positive direction, and the right side corresponds to a negative direction. In the vertical axis Y, in the case of the upside units 2U, 5U, the upside corresponds to a positive direction and the downside corresponds to a negative direction, and in the case of the downside units 2D, 5D, the downside corresponds to a positive direction, and the upside corresponds to a negative direction. In the reference optical axis Z, in a respective one of the upside units 2U, 5U and the downside units 2D, 5D, the front side corresponds to a positive direction, and the rear side corresponds to a negative direction.

The reflecting surfaces 2V, 2D are made of a parabola-based, free curved face (NURBS-curved face). A reference focal point F of the reflecting surfaces 2V, 2D is positioned on the reference optical axis Z and between the center O1 of the light emitting chip 4 and a long side at the rear side of the light emitting chip 4. In this example, the above focal point is positioned at a long side 4*a* at the rear side of the light emitting chip 4. In addition, a reference focal point distance between the reflecting surfaces 2V and 2D is about 10 mm to 18 mm.

The reflecting surfaces 2U, 2D are made up of segments 21, 22, 23, 24, 25, 26, 27, 28 divided into eight sections in the vertical-axis Y direction. A fourth segment 24 at a central part constitutes a first reflecting surface. In addition, a fifth segment 25 at a central part constitutes a second reflecting surface. Further, a first segment 21, a second segment 22, a third segment 23, a sixth segment 26, a seventh segment 27, and an eighth segment 28 at end parts constitute a third reflecting surface.

Figure 6:
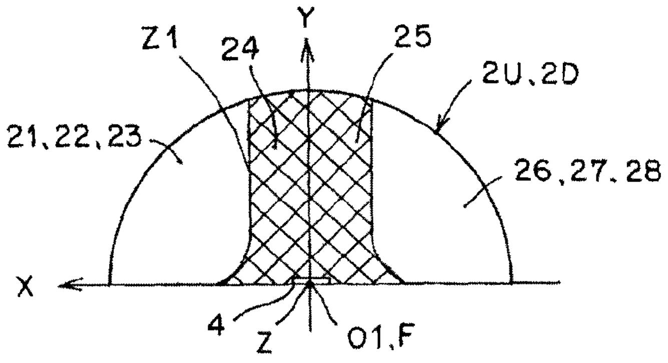
FIG. 6 is an explanatory front view showing a range in which a first reflecting surface made of a fourth segment and a second reflecting surface made of a fifth segment are provided, similarly.

The fourth segment 24 of the first reflecting surface and the fifth segment 25 of the second reflecting segment, at the central part, is provided in a range Z1 between two longitudinal thick solid lines in FIG. 2, in which the lattice oblique lines in FIG. 6 are drawn, i.e., in the range ZI of a longitudinal angle θ of ±40 degrees from the center O1 of the light emitting chip 4 (±0 degrees in FIG. 5). The first segment 21, the second segment 22, the third segment 23, the sixth segment 26, the seventh segment 27, and the eighth segment 28, of the third reflecting surface at the end part, are provided in a white-ground range in FIG. 6 other than the range ZI, i.e., in the range of the longitudinal angle of ±40 degrees or more from the center O1 of the light emitting chip 4.

Figure 7:
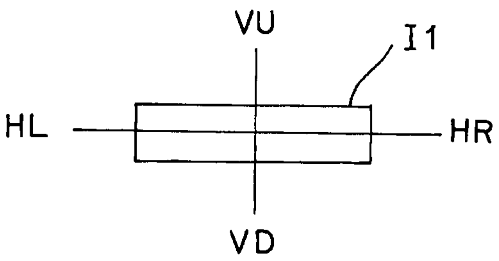
FIG. 7 is an explanatory view showing a reflection image of the light emitting chip, obtained at a point P1 of the reflecting surface, similarly.
Figure 8:
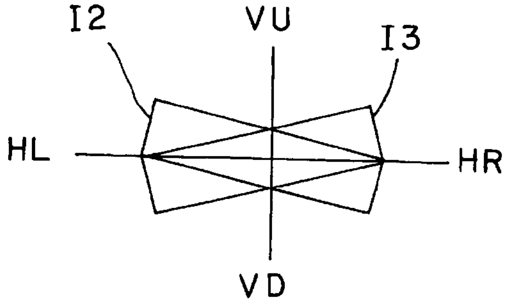
FIG. 8 is an explanatory view showing a reflection image of the light emitting chip, obtained at points P2, P3 of the reflecting surface, similarly.
Figure 9:
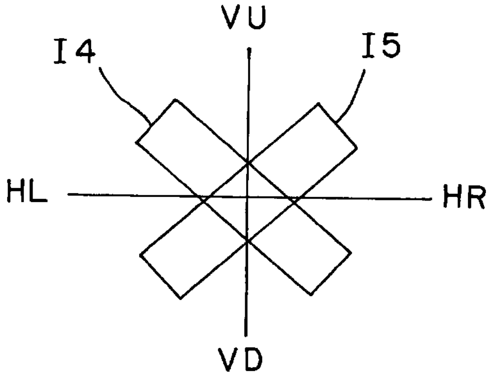
FIG. 9 is an explanatory view showing a reflection image of the light emitting chip, obtained at points P4, P5 of the reflecting surface, similarly.

Hereinafter, a reflection image (screen mapping) of the light emitting chip 4 shaped like a planar rectangle, obtained in each of the segments 21 to 28 of the reflecting surfaces 2U, 2D, will be described referring to FIGS. 7, 8, and 9. In other words, at a boundary P1 between the fourth segment 24 and the fifth segment 25, as shown in FIG. 7, a reflection image I1 of the light emitting chip 4 with a tilt angle of about 0 degree is obtained with respect to a horizontal line HL-HR of a screen. In addition, at a boundary P2 between the third segment 23 and the fourth segment 24, as shown in FIG. 8, a reflection image I2 of the light emitting chip 4 with a tilt angle of about 20 degrees is obtained with respect to the horizontal line HL-HR of the screen. Further, at a boundary P3 between the fifth segment 25 and the sixth segment 26, as shown in FIG. 8, a reflection image I3 of the light emitting chip 4 with a tilt angle of about 20 degrees is obtained with respect to the horizontal line HL-HR of the screen. Furthermore, at a boundary P4 between the second segment 22 and the third segment 23, as shown in FIG. 9, a reflection image I4 of the light emitting chip 4 with a tilt angle of about 40 degrees is obtained with respect to the horizontal line HL-HR of the screen. Still furthermore, at a boundary P5 between the sixth segment 26 and the seventh segment 27, as shown in FIG. 9, a reflection image I5 of the light emitting chip 4 with a tilt angle of about 40 degrees is obtained with respect to the horizontal line HL-HR of the screen.

As a result, in the fourth segment 24 of the reflecting surfaces 2U, 2D, reflection images from the reflection image I1 with the tilt angle of about 0 degree, shown in FIG. 7, to the reflection image I2 with the tilt angle of about 20 degrees, shown in FIG. 8, are obtained. Moreover, in the fifth segment 25 of the reflecting surfaces 2U, 2D, reflection images from the reflection image I1 with the tilt angle of about 0 degree, shown in FIG. 7, to the reflection image I3 with the tilt angle of about 20 degrees, shown in FIG. 8, are obtained. Further, in the third segment 23 of the reflecting surfaces 2U, 2D, reflection images from the reflection image I2 with the tilt angle of about 20 degrees, shown in FIG. 8, to the reflection image I5 with the tilt angle of about 40 degrees, shown in FIG. 9, are obtained. Furthermore, in the first segment 21 and the second segment 22; and the seventh segment 27 and the eighth segment 28, of the reflecting surfaces 2U, 2D, a reflection image with a tilt angle of 40 degrees is obtained.

Here, the reflection images from the reflection image I1 with the tilt angle of about 0 degree, shown in FIG. 7, to the reflection images I2, 13 with the tilt angle of 20 degrees, shown in FIG. 8, are reflection images which are optimal to form light distribution including the oblique cutoff line CL1 of the light distribution pattern LP for low beam. In other words, this is because it is easy to take the reflection images from the reflection image I1 with the tilt angle of about 0 degree to the reflection images I2, 13 with the tilt angle of about 20 degrees along the oblique cutoff line CL1 with the tilt angle of about 15 degrees. On the other hand, the reflection images with the tilt angle of about 20 degrees or more, including the reflection images I4, I5 with the tilt angle of about 40 degrees or more, shown in FIG. 9, are reflection images which are unsuitable to form light distribution including the oblique cutoff line CL1 of the light distribution pattern LP for low beam. In other words, this is because, if the reflection image with the tilt angle of 20 degrees or more is taken along the oblique cutoff line CL1 with the tilt angle of about 15 degrees, light distribution becomes thick in a vertical direction, causing excessive short-distance light distribution (i.e., light distribution of its lowered long-distance visibility).

Figure 3:
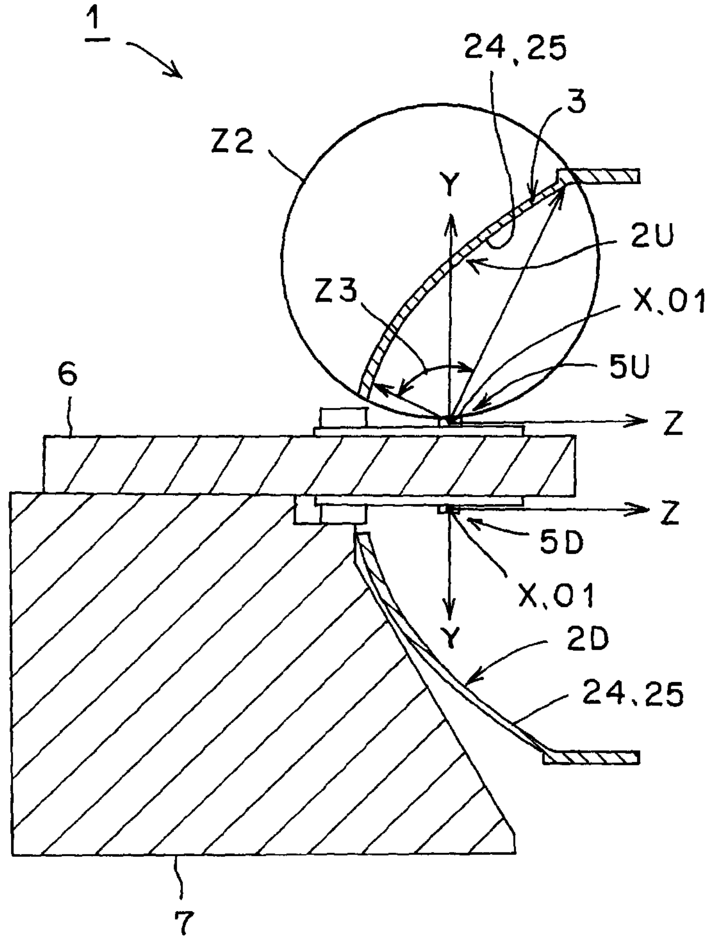
FIG. 3 is a sectional view taken along the line in FIG. 2, similarly.

In addition, light distribution in the oblique cutoff line CL1 is responsible for long-distance visible light distribution. Thus, there is a need to form a high luminous intensity zone (high-energy zone) for the light distribution in the oblique cutoff line CL1. Therefore, the fourth segment 24 of the first reflecting surface and the fifth segment 25 of the second reflecting surface, of the central part, are included in a high-energy range Z3 in an energy distribution (Lambertian) Z2 of the light emitting chip 4, as shown in FIG. 3. In FIG. 3, the energy distribution of a lower semiconductor-type light source 5D is not shown.

From the foregoing description, a reflecting surface optimal to form the light distribution in the oblique cutoff line CL1 is determined depending upon a relative relationship between a range in which the reflection images I1, I2 within the tilt angle of 20 degrees, of a parabola-based, free curved reflecting surfaces, are obtained, and the energy distribution (Lambertian) of the semiconductor-type light sources 5U, 5D. As a result, the reflecting surface optimal to form the light distribution in the oblique cutoff line CL1, i.e., the fourth segment 24 and the fifth segment 25 are equivalent to the range Z1 in which the longitudinal angle is ±40 degrees from the center O1 of the light emitting chip 4, in which the reflection images I1, I2 within an angle (about 20 degrees) obtained by adding about 5 degrees to the tilt angle (about 15 degrees) of the oblique cutoff line CL1 are obtained, and are provided in the high-energy range Z3 in the energy distribution (Lambertian) Z2 of the light emitting chip 4.

The first reflecting surface made of the fourth segment 24, as shown FIGS. 10 and 12, is a reflecting surface made of a free curved face for light-distributing and controlling the reflection images I1, I3 of the light emitting chip 4 in the range Z4 in the light distribution pattern LP for low beam, so that: the reflection images I1, I2 of the light emitting chip 4 do not run out of the oblique cutoff line CL1 and the horizontal cutoff line CL2; and a part of the reflection images I1, I2 of the light emitting chip 4 is substantially in contact with the oblique cutoff line CL1 and the horizontal cutoff line CL2.

In addition, the second reflecting surface made of the fifth segment 5, as shown in FIGS. 11 and 12, is a reflecting surface made of a free curved face for light-distributing and controlling the reflection images I1, I3 of the light emitting chip 4 in the range Z5 containing the range Z4 in the light distribution pattern LP for low beam, so that: the reflection images I1, I3 of the light emitting chip 4 do not run out of the oblique cutoff line CL1 and the horizontal cutoff line CL2 and a part of the reflection images I1, I3 of the light emitting chip 4 is substantially in contact with the oblique cutoff line CL1 and the horizontal cutoff line CL2; and so that: the density of a group of the reflection images I1, I3 of the light emitting chip 4 becomes lower than the density of a group of the reflection images I1, I2 of the light emitting chip 4 according to the first reflecting surface made of the fourth segment 24; and the group of the reflecting surfaces I1, I3 of the light emitting chip 4 contains the group of the reflection images I1, I2 of the light emitting chip 4 by the first reflecting surface made of the fourth segment 24.

Further, the third reflecting surface made of the first segment 21, the second segment 22, the third segment 23, the sixth segment 26, the seventh segment 27, and the eighth segment 28 is a reflecting surface made of a free curved face for light-distributing and controlling the reflection images I4, I5 of the light emitting chip 4 in a range Z6 containing the ranges Z4, Z5 in the light distribution pattern LP for low beam, so that: the reflection images I4, I5 of the light emitting chip 4 are substantially included in the light distribution pattern LP for low beam; the density of a group of the reflection images I4, I5 of the light emitting chip 4 becomes lower than the density of a group of the reflection images I1, I2 of the light emitting chip 4 according to the first reflecting surface made of the forth segment 24 and the density of a group of the reflection images I1, I3 of the light emitting chip 4 according to the second reflecting surface made of the fifth segment 25; and the group of the reflection images I4, I5 of the light emitting chip 4 contains the group of the reflection images I1, I2 of the light emitting chip 4 according to the first reflecting surface made of the fourth segment 24 and the group of the reflection images I1, I3 of the light emitting chip 4 according to the second reflecting surface made of the fifth segment 25.

The vehicle headlamp 1 of the embodiment is made up of the constituent elements as described above, and hereinafter, functions of these constituent elements will be described.

First, the light emitting chip 4 of each of the upside semiconductor-type light source 5U and the downside semiconductor-type light source 5D in the vehicle headlamp 1 is lit to emit light. The light is then radiate from the light emitting chip 4 of each of the upside semiconductor-type light source 5U and the downside semiconductor-type light source 5D. This light is reflected on the upside reflecting surface 2U and the downside reflecting surface 2D, of the reflector 3. This reflected light is emitted to a forward direction of a vehicle, as a light distribution pattern LP for low beam, shown in FIG. 12.

In other words, the reflection light from the first reflecting surface made of the fourth segment 24 of the reflecting surfaces 2U, 2D is light-distributed and controlled in the range Z4 in the light distribution pattern LP for low beam, so that: the reflection images I1, I2 of the light emitting chip 4 do not run out of the oblique cutoff line CL1 and the horizontal cutoff line CL2; and a part of the reflection images I1, I2 of the light emitting chip 4 is substantially in contact with the oblique cutoff line CL1 and the horizontal cutoff line CL2.

In addition, the reflection light from the second reflecting surface made of the fifth segment 25 of the reflecting surfaces 2U, 2D is light-distributed and controlled in the range Z5 containing the range Z4 in the light distribution pattern LP for low beam, so that: the reflection images I1, I3 of the light emitting chip 4 do not run out of the oblique cutoff line CL1 and the horizontal cutoff line CL2 and a part of the reflection images I1, I2 of the light emitting chip 4 is substantially in contact with the oblique cutoff line CL1 and the horizontal cutoff line CL2; and the density of a group of the reflection images I1, I3 of the light emitting chip 4 becomes lower than the density of a group of the reflection images I1, I2 of the light emitting chip 4 according to the first reflecting surface made of the fourth segment 24 and the group of the reflection images I1, I3 of the light emitting chip 4 contains the group of the reflection images I1, I2 of the light emitting chip 4 according to the first reflecting surface made of the fourth segment 24.

Further, the reflection light from the third reflecting surface made of the first segment 21, the second segment 22, the third segment 23, the sixth segment 26, the seventh segment 27, and the eighth segment 28, of the reflecting surfaces 2U, 2D, is light-distributed and controlled in a range Z6 containing the ranges Z4, Z5, in the light distribution pattern LP for low beam, so that: the reflection images I4, I5 of the light emitting chip 4 are substantially included in the light distribution pattern LP for low beam; the density of the group of the reflecting images I4, I5 of the light emitting chip 4 becomes lower than the density of the group of the reflection images I1, I2 according to the first reflecting surface made of the fourth segment 24 and the density of the group of the reflection images I1, I3 of the light emitting chip 4 according to the second reflecting surface made of the fifth segment 25; and the group of the reflection images I4, I5 of the light emitting chip 4 contains the group of the reflection images I1, I2 of the light emitting chip 4 according to the first reflecting surface made of the fourth segment 24 and the group of the reflection images I1, I3 of the light emitting chip 4 according to the second reflecting surface made of the fifth segment 25.

In such a manner as described above, the light distribution pattern LP for low beam, shown in FIG. 12, is illuminated toward a forward direction of a vehicle.

The vehicle headlamp 1 of the embodiment is made of the constituent elements and functions as described above, and hereinafter, its advantageous effect(s) will be described.

In the vehicle headlamp 1 of the embodiment, a high luminous intensity zone (range Z4) is light-distributed and controlled in the vicinity of the oblique cutoff line CL1 at the cruising lane side (left side) of the light distribution pattern LP for low beam and the horizontal cutoff line CL2 at the opposite lane side (right side), by means of the first reflecting surface 24 made of the fourth segment, so that long-distance visibility is improved and no stray light is imparted to an oncoming car or pedestrian, etc., making it possible to contribute to traffic safety as a result thereof. Moreover, in the vehicle headlamp 1 of the embodiment, a middle luminous intensity zone (range Z5) which is light-distributed and controlled on the second reflecting surface made of the fifth segment 25 encompasses the high luminous intensity zone (range Z4) in the vicinity of the oblique cutoff line CL1 and the horizontal cutoff line CL2 of the light distribution pattern LP for low beam, light-distributed and controlled on the first reflecting surface, so that the high luminous intensity zone (range Z4) light-distributed and controlled on the first reflecting surface is connected to a low luminous intensity zone (Z6 for semiconductor-type light source) of the entire light distribution pattern LP for low beam, light-distributed and controlled on the third reflecting surface made of the first segment 21, the second segment 22, the third segment 23, the sixth segment 26, the seventh segment 27, and the eighth segment 28, in the middle luminous intensity zone (range Z5) light-distributed and controlled on the second reflecting surface, and a smooth change in luminous intensity occurs. As a result, the vehicle headlamp 1 of the embodiment becomes capable of light-distributing and controlling the light distribution pattern LP for low beam, the light distribution pattern LP suitable for vehicle use, having the oblique cutoff line CL1 and the horizontal cutoff line CL2.

Moreover, the vehicle headlamp 1 of the embodiment is made of the reflector 3, the upside semiconductor-type light source 5U, and the downside semiconductor-type light source 5D, so that the number of components is reduced in comparison with the conventional vehicle headlamps, and downsizing, weight reduction, and cost reduction can be achieved accordingly. Furthermore, in the vehicle headlamp 1 of the embodiment, a relationship between the numbers of constituent light sources and optical elements is obtained as that of one set of the upside semiconductor-type light source 5U and the downside semiconductor semiconductor-type light source 5D to one optical element made of the reflector 3 (1:1). As a result, the vehicle headlamp 1 of the embodiment is capable of eliminating an error concerning a combination of variations at the optical element side and improving assembling precision of the reflector 3 at the optical element side, in comparison with the conventional vehicle headlamp in which the relationship between the numbers of constituent light sources and optical elements is obtained as that of one light source to three optical elements, i.e., the reflector, shade, and the projecting lens (1:3).

In addition, in the vehicle headlamp 1 of the embodiment, the reflector 3 is shaped like a substantially rotating parabola face; the size of an opening of the reflector 3 is 100 mm or less in diameter; a reference focal point F of the reflecting surfaces 2U, 2D is on a reference optical axis Z and is positioned between the center O1 of the light emitting chip 4 and the long side at the rear side of the light emitting chip 4; the reference focal point distance of the reflecting surfaces 2U, 2D is about 10 mm to 18 mm; and the first reflecting surface made of the fourth segment 24 and the second reflecting surface made of the fifth segment 25 are provided in the range Z1 in which the longitudinal angle is within ±40 degrees from the center O1 of the light emitting chip 4 and an inclination to a screen horizontal line HL-HR of the reflecting image of the light emitting chip 4 is equivalent to a range in which a reflection image is obtained within an angle (about 20 degrees) obtained by adding about 5 degrees to a tilt angle (about 15 degrees) of the oblique cutoff line CL1 and is formed in the range Z3 of high energy in the energy distribution Z2 of the light emitting chip 4. As a result, the vehicle headlamp 1 of the embodiment is capable of reliably achieving both light-distributing and controlling of the light distribution pattern LP for low beam, which is suitable for vehicle use, and downsizing of a lamp unit.

Further, the vehicle headlamp 1 of the embodiment is disposed so that: an upside unit made of the upside reflecting surface 2U and the upside semiconductor-type light source 5U, a light emitting face of the light emitting chip 4 being oriented upward in a vertical-side Y direction, and a downside unit made of the downside reflecting surface 2D and the downside semiconductor-type light source 5D, the light source face of the light emitting chip 4 being oriented downward in the vertical-axis Y direction, is established in a point-symmetrical state. As a result, even if the reflector 3 is downsized, the luminous intensity of the light distribution pattern LP for low beam can be sufficiently obtained, so that the vehicle headlamp 1 of the embodiment is capable of more reliably achieving both light-distributing and controlling of the light distribution pattern for low beam, which is suitable for vehicle use, and downsizing of a lamp unit.

The foregoing embodiment described a light distribution pattern LP for low beam as a light distribution pattern. However, in the present invention, a light distribution pattern may be a light distribution pattern other than the light distribution pattern LP for low beam, for example, a light distribution pattern having an oblique cutoff line on a cruising lane side and a horizontal cutoff line on an opposite lane side, with an elbow point serving as a boundary, such as a light distribution pattern for expressway or a light distribution pattern for fog lamp, for example.

In addition, the foregoing embodiment described the vehicle headlamp 1 for left-side cruising lane. However, the present invention is applicable to a vehicle headlamp for right-side cruising lane.

Further, the foregoing embodiment described the vehicle headlamp 1, in which an upside unit made of the upside reflecting surface 2U and the upside semiconductor-type light source 5U and a downside unit made of the downside reflecting surface 2D and the downside semiconductor-type light source 5D are disposed in a point-symmetrical state. However, in the invention, there may be a vehicle headlamp made up of only an upside unit made of the upside reflecting surface 2U and the upside semiconductor-type light source 5U or a vehicle headlamp made up of only a downside unit made of the downside reflecting surface 2D and the downside semiconductor-type light source 5D.

Furthermore, the foregoing embodiment described use of the first segment 21 to the eighth segment 28 as reflecting surfaces forming a light distribution pattern LP for low beam. However, in the present invention, the first segment 21 and the eighth segment 28 may be used as no-light emitting faces or other reflecting surfaces forming a light distribution pattern. In addition, a downside portion or an upside portion with respect to the double-dotted chain line of the fourth segment 24 and the fifth segment 25 may be used as a no-light emitting face or any other reflecting face forming a light distribution pattern, similarly.

What is claimed is:

1. A vehicle headlamp, comprising:

(i) a semiconductor-type light source for emitting light;

(ii) a reflector made of a parabola-based curved face, having a plurality of reflecting surfaces which are divided along the vertical-axis direction, for reflecting light radiated in a vertical-axis direction from a light emitting face of the semiconductor-type light source, as reflection light, so as to illuminate the reflected light toward a forward direction of a vehicle, wherein:

the plurality of reflecting surfaces of the reflector includes a predetermined reflecting surface provided in a range in which a reflection image of the semiconductor-type light source is obtained within a longitudinal angle of ±40 degrees from a center in a vertical-axis direction of the light emitting face of the semiconductor-type light source and in a range of high energy in energy distribution of the semiconductor-type light source, the predetermined reflecting surface of the reflector includes a first reflecting surface and a second reflecting surface adjacent to each other at a center of the reflector;

the first reflecting surface is a reflecting surface on which a reflection image group of the semiconductor-type light source according to the first reflecting surface is formed near the oblique cutoff line and the horizontal cutoff line in comparison with the refection image group of the semiconductor-type light source according to the second reflecting surface, and density of the reflection image group of the semiconductor-type light source according to the first reflecting surface is higher than density of the reflection image group of the semiconductor-type light source according to the second reflecting surface; and the second reflecting surface has a light distribution range of the reflection image of the semiconductor-type light source including a light distribution range of the reflection image of the semiconductor-type light source according to the first reflecting surface so that the reflection image group of the semiconductor-type light source according to the second reflecting surface contains the reflection image group of the semiconductor-type light source according to the first reflecting surface.

2. The vehicle headlamp according to claim 1, wherein:

the predetermined reflecting surface of the reflector is further provided in a range in which the reflection image of the semiconductor-type light source is obtained within about 20 degrees with respect to a screen horizontal face.

3. The vehicle headlamp according to claim 1, wherein:

the predetermined reflecting surface of the reflector is provided at a center of the reflector, and light-distributes a reflection image of the semiconductor-type light source so that the reflection image of the semiconductor-type light source does not run out of an oblique cutoff line and a horizontal cutoff line and so that a part of the reflection image of the semiconductor-type light source is substantially in contact with the oblique cutoff line and the horizontal cutoff line.

4. The vehicle headlamp according to claim 1, wherein:

the predetermined reflecting surface of the reflector is further provided in a range in which the reflection image of the semiconductor-type light source is obtained within an angle obtained by adding about 5 degrees to a tilt angle of an oblique cutoff line with respect to a screen horizontal face.

5. The vehicle headlamp according to claim 1, wherein:

the reflector includes a third reflecting surface arranged at a respective one of ends of the predetermined reflecting surface made up of the first reflecting surface and the second reflecting surface; and the third reflecting surface has a light distribution range of a reflection image of the semiconductor-type light source, including a light distribution range of the reflection images of the semiconductor-type light source according to the first reflecting surface and the second reflecting surface, so that: density of the reflection image group of the semiconductor-type light source according to the third reflecting surface is lower than density of the reflection image groups of the semiconductor-type light source according to the first reflecting surface and the second reflecting surface; and the reflection image group of the semiconductor-type light source according to the third reflecting surface contains the reflection image groups of the semiconductor-type light source according to the first reflecting surface and the second reflecting surface.

6. The vehicle headlamp according to claim 1, wherein:

light radiated from the semiconductor-type light source is reflected by means of a plurality of reflecting surfaces including the predetermined reflecting surface of the reflector, as a light distribution pattern for low beam, formed by an oblique cutoff line of a cruising lane and a horizontal cutoff line at an opposite lane side, and the reflected light is illuminated toward the forward direction of the vehicle.

7. A vehicle headlamp, comprising:

(i) a semiconductor-type light source for emitting light;

(ii) a reflector made of a parabola-based curved face, having a plurality of reflecting surfaces which are divided along the vertical-axis direction, for reflecting light radiated in a vertical-axis direction from a light emitting face of the semiconductor-type light source, as reflection light, so as to illuminate the reflected light toward a forward direction of a vehicle, wherein:

the plurality of reflecting surfaces of the reflector includes:

a first reflecting surface and a second reflecting surface which are adjacent to each other at a center of the reflector and are arranged in a range of high energy in energy distribution of the semiconductor-type light source; and a third reflecting surface which is arranged at a respective one of ends of the reflector so as to sandwich the first reflecting surface and the second reflecting surface therebetween, and is arranged in a range of low energy in energy distribution of the semiconductor-type light source; and wherein:

the first reflecting surface is a reflecting surface on which a reflection image group of the semiconductor-type light source according to the first reflecting surface is formed near the oblique cutoff line and the horizontal cutoff line in comparison with the refection image group of the semiconductor-type light source according to the second reflecting surface, and density of the reflection image group of the semiconductor-type light source according to the first reflecting surface is higher than density of the reflection image group of the semiconductor-type light source according to the second reflecting surface; and the first reflecting surface and the second reflecting surface are provided in a range in which a reflection image of the semiconductor-type light source is obtained within a longitudinal angle of about ±40 degrees from a center in a vertical-axis direction of the light emitting face of the semiconductor-type light source.

8. The vehicle headlamp according to claim 7, wherein:

the first reflecting surface and the second reflecting surface of the reflector are further provided in a range in which a reflection image of the semiconductor-type light source is obtained within about 20 degrees with respect to a screen horizontal face.

9. The vehicle headlamp according to claim 7, wherein:

the first reflecting surface and the second reflecting surface of the reflector light-distribute the reflection images of the semiconductor light source so that the reflection image of the semiconductor-type light source does not run out of the oblique cutoff line and the horizontal cutoff line and a part of the reflection image of the semiconductor-type light source is substantially in contact with the oblique cutoff line and the horizontal cutoff line.

* * * * *